United States Patent [19]

Heinz et al.

[11] Patent Number: 4,996,256

[45] Date of Patent: Feb. 26, 1991

[54] FREE-FLOWING POLYARYLENE SULFIDES CRYSTALLIZING WITH DELAY

[75] Inventors: Hans-Detlef Heinz; Burkhard Köhler; Rolf-Volker Meyer, all of Krefeld; Klaus Reinking, Wermelskirchen; Alexa Sommer, Cologne, all of Fed. Rep. of Germany

[73] Assignee: Bayer Aktiengesellschaft, Leverkusen, Fed. Rep. of Germany

[21] Appl. No.: 358,065

[22] Filed: May 30, 1989

[30] Foreign Application Priority Data

Jun. 8, 1988 [DE] Fed. Rep. of Germany ....... 3819479

[51] Int. Cl.$^5$ ................................................ C08K 5/32
[52] U.S. Cl. .................................... 524/112; 524/172; 524/217; 524/259; 524/260
[58] Field of Search ............... 524/112, 217, 172, 259, 524/260

[56] References Cited

U.S. PATENT DOCUMENTS

| | | | |
|---|---|---|---|
| 3,247,162 | 4/1966 | Newland et al. | 524/260 |
| 3,268,499 | 8/1966 | Wales | 524/260 |
| 3,852,227 | 12/1974 | Matsuda et al. | 524/260 |
| 4,007,159 | 2/1977 | Dounchis | 524/260 |
| 4,699,975 | 10/1987 | Katto et al. | 524/112 |

FOREIGN PATENT DOCUMENTS 2039503  8/1980  United Kingdom .

*Primary Examiner*—Veronica P. Hoke
*Attorney, Agent, or Firm*—Connolly and Hutz

[57] ABSTRACT

The invention relates to new, free-flowing arylene sulfide polymers (PAS) preferably phenylene sulfide polymers, which crystallize with delay, optionally additionally display improved resistance to UV radiation, and are prepared by mixing PAS with aromatic mononitro compounds in the melt, preferably with the application of shearing forces.

7 Claims, No Drawings

FREE-FLOWING POLYARYLENE SULFIDES CRYSTALLIZING WITH DELAY

This invention relates to new, free-flowing arylene sulfide polymers (PAS), preferably phenylene sulfide polymers, which crystallize with delay, optionally additionally display improved resistance to UV radiation, and are prepared by mixing PAS with aromatic mononitro compounds in the melt, preferably with the application of shearing forces.

Arylene sulfide polymers are known, for example from U.S. Pat. No. 3,354,129, EP-OS 171 021. They are becoming increasingly interesting for the electrical industry and other branches of industry as inert, high-temperatureresistant thermoplastics which, in addition, can be filled to a high degree with glass fiber and/or other materials.

By virtue of their easy processability, the use of these polymers, particularly polyparaphenylene sulfide (PPS), is increasing above all in applications which have hitherto been reserved for duroplastics.

Injection-mouldable PPS moulding compounds, which usually contain glass fibers and/or mineral fillers in high concentrations, are generally distinguished by low melt viscosities. As a result they are normally not difficult to process by injection moulding.

In the production of thin-walled parts, however, the marked tendency of arylene sulfide polymers towards crystallization can give rise to difficulties in special cases if the flow paths of the melts in the mould are long. This can be the case when, to eliminate warping, the gates are positioned in such a way that the glass fibers are preferentially oriented.

Accordingly, to improve the processability of optionally fiber-reinforced or mineral-filled arylene sulfide polymers, it would be of advantage to reduce the crystallization rate of the melts. This can be done by lowering the temperature at which the melts begin to crystallize during cooling.

It is known that the crystallization rate of a partially crystalline polymer can be reduced by incorporation of comonomers. However, comonomer-containing polyphenylene sulfides are often only obtained as oligomers because many comonomers contain functional groups which can negatively affect the synthesis of PPS, for example carbonyl, sulfone, carboxyl, sulfonic acid and ether groups. Oligomers such as these usually exhibit inadequate mechanical properties. Accordingly, they may not be suitable for the production of mouldings.

It is known from DE-OS 2 903 100 that sulfonate salts optionally containing nitro groups may be used as flame-proofing agents for thermoplastics, including for example PPS. Since salts are involved here, the use of these thermoplastics can be limited, if for example insulation properties of a material are in demand.

It has now been found that, after mixing with certain high-boiling, aromatic mononitro compounds, arylene sulfide polymers show a reduced crystallization rate and favorable flow properties as well as optionally, in addition, improved resistance to UV radiation without any significant reduction in the melting point of the arylene sulfide polymer.

Accordingly, the present invention relates to free-flowing arylene sulfide polymers which crystallize with delay, optionally additionally display improved UV resistance and are prepared by mixing 75 to 99% by weight, preferably 80 to 98% by weight and, more preferably, 85 to 96% by weight of one or more arylene sulfide polymers, preferably polyphenylene sulfide, in the melt with 1 to 25% by weight, preferably 2 to 20% by weight and more preferably 4 to 15% by weight of one or more selected high-boiling, aromatic mononitro compounds which do not contain any sulfonate salt groups.

The aromatic mononitro compounds suitable for use in accordance with the invention are known in principle or may be obtained by methods which are known in principle. They have boiling points at normal pressure of at least 200° C., preferably of at least 250° C. and, more preferably, of at least 300° C. They may contain further, electron-attracting substituents and are preferably halogen-free.

Particularly suitable electron-attracting substituents are, for example, ester or amide groups.

Examples of mononitro compounds suitable for the invention are 3-nitroacetanilide, propionic acid (3-nitro)-anilide, butyric acid (3-nitro)-anilide, 2-nitrobiphenyl, 4-nitrobiphenyl, 3-nitro-4-chloroacetanilide, 2-nitro-anthraquinone, 3-nitroanthraquinone, 3-nitrobenzoic acid, 4-nitrobenzoic acid, 4-nitrobenzphenolate, 4-nitrobenzophenone, 2-nitrodiphenyl sulfone, 4-nitrodiphenyl sulfone, 3-nitrobenzamide, 4-nitrobenzamide, 4-nitrobenzoic acid butyl amide, 4-nitrobenzoic acid dodecyl amide, 4-nitrobenzoic acid stearyl amide, 4-nitrobenzoic acid behenyl amide (behenyl=$C_{22}$ alkyl radical ), 4-nitrobenzoic acid diphenyl amide, 4-nitrobenzoic acid methyl ester, 4-nitrobenzoic acid ethyl ester, 4-nitrobenzoic acid dodecyl ester, 4-nitrobenzoic acid 4-nonyl phenyl ester, 3-nitrobenzoic acid phenyl ester, 3-nitrobenzoic acid diphenyl amide. Paritcularly preferred nitro compounds are those which have a boiling point of at least 300° C. at normal pressure.

According to the invention, the mononitro compounds may be used individually or in admixture.

The modified arylene sulfide polymers according to the invention are prepared in the melt, preferably with the application of shearing forces and optionally in an inert gas atmosphere (for example nitrogen). Any of the processes normally used for mixing in the processing of thermoplastics, including for example kneading, extrusion, etc. are suitable for the preparation of the arylene sulfide polymers according to the invention.

The polyarylene sulfides according to the invention, preferably PPS, may also contain typical fillers such as, for example, glass fibers, quartz powder, mica, talcum, metal oxides, pigments, carbon fibers, carbon black, etc., or rubber-like alloying partners for increasing impact strength.

They may be processed in the usual way, optionally after addition of standard auxiliaries, such as for example mould release agents, stabilizers, antioxidants, etc., to form shaped articles, such as semi-finished products, fibers, films, injection-moulded articles, etc.

The modified arylene sulfide polymers are distinguished by a reduced crystallization rate and a low melt viscosity for substantially the same melting temperature of the polymer. They can also optionally have the additional surprising advantage of improved resistance to UV radiation.

A method of determining the scale of bond breakage as a result of UV radiation is to measure the concentration of free radicals under radiation, for example by means of ESR spectroscopy.

The polyarylene sulfides, preferably PPS, according to the invention may be used for the known applications for PPS, e.g. for the production of fibers, films and moulded articles.

Melt viscosity was measured using a Contraves RM 300 plate-cone viscosimeter while the DSC measurements were carried out with a Perkin-Elmer DSC system 7.

The maximum of the crystallization exotherms during cooling from the melt (dynamic crystallization) was used as a measure of the crystallization rate.

EXAMPLES

EXAMPLE 1

In a round-bottomed flask, 50 g PPS granulate having a melt viscosity of 25 Pas at 320° C,. and at a shear rate of $100s^{-1}$ were mixed with 5.5 g 3 nitrobenzamide and the resulting mixture heated under nitrogen to 320° C. and homogenized with stirring. Stirring was continued for a total of 30 minutes after melting of the polymer.

The heating baths were then removed, the mixtures cooled to room temperature and the samples chopped up.

The results of DSC measurement and melt viscosity measurement are shown in the Table.

EXAMPLE 2

A modified polyparaphenylene sulfide was prepared as in Example 1 from a mixture of PPS having a melt viscosity of 25 PAS at 320° C. and at a shear rate of 100 $s^{-1}$ and 3-nitroacetanilide containing 10% by weight of the nitro compound. The results of the DSC measurement and melt viscosity measurement are shown in the Table.

EXAMPLE 3

A modified polyparaphenylene sulfide was prepared as described in Example 1 from a mixture of PPS having a melt viscosity of 38 Pas at 320° C. and at a shear rate of 100 $s^{-1}$ and 4-nitrobenzoic acid stearyl amide (10% by weight). The results of the DSC measurement are shown in the Table.

COMPARISON EXAMPLE 1

The pure PPS granulate used in Examples 1 and 2 was melted as described in Example 1, stirred for 30 minutes and, after removal of the heating bath, the polymer was cooled to room temperature and chopped up.

The results of the DSC measurement and melt viscosity measurement are shown in the Table.

COMPARISON EXAMPLE 2

The PPS granulate used in Example 3 was stirred for 30 minutes as in Example 1 sand, after removal of the heating bath, the polymer was cooled to room temperature and chopped up. The results of the DSC measurement are shown in the Table.

In the following Table, Tm stands for the melting point of the PPS while Tc stands for the maximum of the crystallization exotherm during cooling. Both were measured at a heating or cooling rate of 20 K $min^{-1}$.

MV stands for the melt viscosity of the mixture at a temperature of 320° C. and a shear rate of 100 $s^{-1}$.

TABLE

| Example | Tm (°C.) | Tc (°C.) | MV (Pas) |
| --- | --- | --- | --- |
| 1 | 276.8 | 199.9 | 23 |
| 2 | 276.7 | 197.1 | 25 |
| 3 | a | 221.8 | a |
| Comparison 1 | 281.5 | 239.0 | 25 |
| Comparison 2 | a | 233.2 | a | a = not measured

EXAMPLE 4

A melt is produced from poly-p-phenylene sulfide with a melt viscosity of 44 Pas (306° C., $1,000s^{-1}$) and 5% (based on the mixture) of 4-nitronaphthalene-1,8-dicarboxylic acid anhydride and worked up in the usual way.

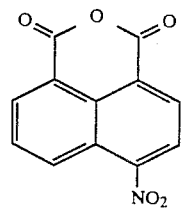

Flakes of PPS are scraped from this solidified melt with the aid of a corundum scraper and are filled into an ESR tube (diameter 3mm). After waiting for a period of several days the tube is irradiated in air at −110° C. with a 500 W Hg lamp, the shortwave section (<305 nm) of which has been filtered out. The low temperature prevents the free radicals produced by the radiation from reacting further.

The difference between the radicals formed in 60 minutes and those formed in 30 minutes is selected as the criterion of the rate of radical formation. The difference is: 30 (relative figures. This can be determined by ESR-Spectroscopy.

COMPARISON EXAMPLE 3

The rate of radical formation of PPS is determined in the same manner. The difference is: about 180 (relative figures).

EXAMPLE 5

The rate of radical formation of a PPS modified with 5% (based on the mixture) of 4-nitrobenzoic acid stearyl amide

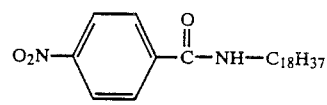

is determined in the same manner. The difference is: 100 (relative figures).

We claim:

1. Composition comprising free-flowing arylene sulfide polymers which crystallize with delay, optionally additionally display improved resistance to UV radiation, and are prepared by mixing 75 to 99% by weight of one or more arylene sulfide polymers in the melt with 1 to 25% by weight of one or more aromatic mononitro compounds which do not contain any sulfonate salt groups and has a boiling point of at least 200° C.

2. Composition as claimed in claim 1, characterized in that the arylene sulfide polymer is polyparaphenylene sulfide.

3. Composition as claimed in claim 1, characterized in that the mononitro compounds may be used in admixture.

4. Composition as claimed in claim 1 wherein the amount of arylene sulfide polymers is 80 to 98% by weight.

5. Composition as claimed in claim 1 wherein the amount of arylene sulfide polymers is 85 to 96% by weight.

6. Composition as claimed in claim 1 wherein the amount of mononitro compounds is 2 to 20% by weight.

7. Composition as claimed in claim 1 wherein the amount of mononitro compounds is 4 to 15% by weight.

* * * * *